United States Patent [19]
Jones

[11] Patent Number: 5,827,431
[45] Date of Patent: Oct. 27, 1998

[54] AMAZON RAINMAKER

[75] Inventor: James Phillip Jones, 1609 Northway Dr., Jefferson City, Mo. 65109

[73] Assignee: James Phillip Jones, Jefferson City, Mo.

[21] Appl. No.: 783,688

[22] Filed: Jan. 15, 1997

[51] Int. Cl.$^6$ .................................................. A01K 63/04
[52] U.S. Cl. ........................ 210/668; 210/748; 210/749; 210/169
[58] Field of Search .................................... 210/169, 192, 210/198.1, 266, 284, 416.2, 199, 259, 663, 668, 687, 688, 748, 749

[56] References Cited

U.S. PATENT DOCUMENTS

| | | | |
|---|---|---|---|
| 4,648,976 | 3/1987 | Chen | 210/284 |
| 4,719,010 | 1/1988 | Seibel | 210/189 |
| 5,026,477 | 6/1991 | Yen | 210/284 |
| 5,059,315 | 10/1991 | Senape | 210/169 |
| 5,236,595 | 8/1993 | Wang et al. | 210/259 |
| 5,294,335 | 3/1994 | Chiang | 210/169 |
| 5,512,178 | 4/1996 | Dempo | 210/259 |
| 5,569,380 | 10/1996 | Sullivan | 210/284 |
| 5,582,718 | 12/1996 | Sobczak | 210/169 |
| 5,628,895 | 5/1997 | Zucholl | 210/259 |

*Primary Examiner*—Neil McCarthy
*Assistant Examiner*—Theodore M. Green
*Attorney, Agent, or Firm*—James Phillip Jones

[57] ABSTRACT

A system whereby freshwater and saltwater aquaria water may be stripped and sterilized to near laboratory quality distilled water standards and injected with appropriate chemicals and compounds necessary to reproduce the conditions indigenous to the native habitat of any particular species in which you have chosen to raise in your aquarium. This system is attached to standard washer and dryer water outlets and is connected to the device with a standard ¾" garden hose. Tap water is run through a cation resin exchange chamber to pull out negatively charged ions and then passes through an identical chamber containing anion resin exchange media to pull the positively charged ions out of the water coming through. The end result being near zero ppm total dissolved solids. Upon passing through both ion exchange chambers the water is then moved to the outlet where it is run through an eight watt ultraviolet germicidal sterilization chamber to kill any incoming microscopic or submicroscopic organic life forms that would enter the aquaria and introduce germs, pathogen, bacteria or viruses that would be harmful to the fish. Coming from the outlet of the sterilization chamber through a garden hose connected to the chemical injection unit where the mixture of either acids or bases and/or any other necessary chemicals, nutrients or media that are indigenous to the native habitat required in the aquaria would be drawn through a siphon process from a spill-proof vented reservoir injected into the stream of purified water and would be replaced into the aquarium at the exact same pH and with the exact same chemical properties of the water which was removed prior to the refilling of the tank. The water is forced through the device by hydrostatic pressure which can be adjusted at the source. The temperature can also be adjusted at the source by using a Y hose adapter.

5 Claims, 5 Drawing Sheets

AMAZON RAINMAKER

BACKGROUND OF THE INVENTION

The invention relates to the universally accepted procedure of doing weekly or semi-weekly water changes to reduce the end process of the detoxification of ammonia (NH3/NH4), nitrates (NO3) from the aquarium itself This is necessitated due to the fact that high concentrates of nitrates (NO3) in the water inhibit proper growth coloration and an inability of the fish to spawn and/or reproduce in a normal and natural fashion and the inability of the fry or young to be raised in a normal fashion to in any way, shape, or form resemble their parents in size or coloration.

This detoxification process aforementioned involves the detoxification of naturally occurring ammonia (NH3/NH4) buildups caused by the defecation, urination by the occupants and decomposition of organic matter within the biosphere of the aquarium. This is a biological process which follows the following pattern:

Within the intestines of all fishes are two decomposing bacteria; nitrosomonas bacteria and nitrobacter bacteria for "seeding" naturally occurring bodies of water; there are also numerous commercially prepared concentrated cultures of these bacteria that can be added to the tank to "seed the tank" and the tank can be artificially fed by using ammonium chloride (NH4Cl) solution to obtain what is called a "cycled tank".

A cycled tank is capable of taking the ammonia (NH3/NH4) as it is produced by the urine, feces and deteriorated organic matter which is immediately ingested by the nitrosomonus bacteria which excretes nitrite (NO2) which has approximately one-tenth of the toxcidity of ammonia (NH3/NH4), but it is still extremely deadly to all living forms of aquatic life, including plants, algae and invertebrates. The nitrobacter bacteria in turn ingests the nitrite (NO2) and excretes nitrate (NO3) which is approximately one-hundred times less toxic than the nitrite (NO2). The nitrate (NO3) is the end process of the detoxification process of ammonia (NH3/NH4) by aerobic bacteria and is sensed by all fishes as an innate indicator as to the volume of the body of water in which they are in and the number of occupants also in their company. Therefore, by doing weekly or semi-weekly water changes of 25% to 50%, the nitrate (NO3) levels are greatly reduced and "fool the species" into believing biologically that they are in a much larger body of water with fewer occupants which increases growth rates, increases coloration and induces spawning and the appropriate growth and development of the fry of all aquatic species.

The purpose of the Amazon Rainmaker is very simply to reproduce as exactly as possibly the water conditions in the native habitat, and the aquarium from which the water was drawn to suit the specific needs of whichever species is selected by the purchaser to propagate. Fishes are very delicate and require that the water coming back into the tank be very close, if not identical, to the water which was removed during the water change. By striping this water down to that of water comparable to distilled water qualities, it allows an individual to make the proper adjustments to match the water that came out of the tank to reduce stress, shock, disease and to promote the growth, coloration and successful spawning and breeding of the species for which the purchaser has chosen to keep. It also enhances the growth rates as well as the ability to raise the fry or progeny in an environment as close to their native habitat as can possibly be achieved in captivity.

The validity of these statements may be observed in numerous farm ponds or lakes throughout the world which are over populated and contain no fish over the size of four to six inches due to high concentrations of nitrates (NO3) present in the water. Conversely, in an underpopulated body of water, lake or pond, the fish by an innate instinct produce maximum quantities of growth hormones to reach maturity as quickly as possible to obtain their inbred goal to repopulate their species in their environment.

SUMMARY OF THE INVENTION

During the five month period in which I have used the Amazon Rainmaker on an experimental basis to ascertain what kind of results could be obtained by using water treated by this method, I chose as my experimental population the most delicate of fresh water species (Symphysodon aequifasciata axelrodi) commonly known as the Discus. I have personally witnessed growth rates between two and four times greater in the experimental group than those in the control group in which standard water changes using regular tap water treated for chlorine removal only to replace water removal during regularly scheduled water changes. The Amazon Rainmaker itself is two parallel chambers, each separated by a fine mesh screen and connected by a 1¼" tube perpendicular to the chambers at the top and the bottom by shut off values in the middle to allow for the isolated recharge of each separate ion resin exchange chamber media. As the water leaves a standard washer and dryer setup, a Y hose connector would be connected to the hot and cold faucets and the hot should be run until it reaches maximum temperature. At that time, the cold would be turned on and the hot water reduced with a thermometer in the stream until the water is identical to the temperature of the aquarium in which the stream of water would eventually exit the system into. Upon setting the temperature, the hose would be attached to the male end of the Y connector and would go directly into the first chamber and would enter the cation resin exchange beads. The water is forced through the device by hydrostatic pressure which can be adjusted at the water source also. Cations are positively charged ions which hold positively charged molecules and attract negatively charged molecules and exchange them with positively charged molecules. This attracts any precipitate matter, either mineral or metal, holding a negative charge from the water and releases a positively charged molecule from the resin bead leaving the positively charged molecule held on the resin bead. This exchange occurs as the water passes through the ion exchange media. As it moves down through the very tightly packed resin beads, which greatly restricts the flow of the water and increases the efficiency of the ion exchange process, upon running the full length of the chamber, the negatively stripped water moves through another screen and another identical 1¼" tube into a parallel chamber identical to the one it has just left and passing through another screen into the anion exchange chamber. An anion is a negatively charged ion which attracts positively charged molecules. This attracts any precipitate matter, either mineral or metal, holding a positive charge from the water and removes it from the water and releases a negatively charged molecule from the resin bead leaving the negatively charged molecule held on the resin bead. The end result at the top of the chamber as it moves up towards the outlet in a very tightly packed media restricting and slowing down the flow to enhance the efficiency of the ion exchange process is water that has near zero ppm total dissolved solids, void of both the positively and negatively charged ions.

Most of the country has water that is drawn from deep wells and put into gravity towers or draw their water from rivers and streams which run through limestone beds picking up heavy concentrations of minerals and metals. The average pH of tap water nationwide is somewhere close to 8 on a zero to 10 pH scale with the lower ranges being acidic and the higher ranges being basic. During the time the water follows the water shed and falls down through the water tables, it picks up many heavy metals and many minerals, most notably calcium (Ca), magnesium (Mn) and iron (Fe). Also during this process, there are many forms of bacteria, germs, viruses and other pathogens which as they come back through the anion chamber, exits through another screen into the top 1¼" tube to the outlet and into an 8 watt ultraviolet germicidal sterilization chamber which kills any biological pathogen which could cause the introduction of disease and death to your fish.

As the water progresses on through a garden hose from a sterilization chamber, it hooks into the male standard garden hose fitting of the chemical injection unit. The water coming across a protruding end of a siphoned tube inside the stream of water mounted on top of a reservoir with a vented spill-proof lid allows for any alteration of pH, any addition of dechlorination chemicals as well as medications and any kind of spawning aids, such as Tetra Blackwater Extract, for all Amazon species is metered into the tank proportionate to dosage. As the water enters the chemical injection unit, it passes over a protruding end of a siphon tube which reaches down into the bottom of the reservoir and gradually draws any property altering chemicals into the stream. This flow may be regulated by a needle valve before it reaches the female end which has a three foot non-toxic hose with a ¾" female standard garden hose thread attached to one end and a water diffuser at the other end so that the stream will not upset the decor, the gravel or the fish. The water which is replacing that which was siphoned from the tank prior to the refilling of the tank is pure, bacteria free, the same temperature, and is identical to the water which was siphoned out, making it nitrate (NO3) free. It is substantial to note here that this unit is completely and totally rechargeable and requires no permanent plumbing or alterations to the home or business. The recharge process is a reverse exchange that has taken place as the water has been stripped in each respective ionization chamber. For each oppositely charged molecule that the resin beads are holding, an exchange will be made to replace it with the appropriately charged molecule; thereby releasing the molecules held by the beads and reinstating the original charge of the respective ion resin exchange bead. The cation resin media is recharged with regular table salt, sodium chloride (NaCl), being very cautious not to get the iodized compound, due to the fact that iodine (I) is a deadly toxin to virtually all aquatic wildlife. The anion resin media is recharged with a 6% solution of sulfuric acid (H2SO4) and water, and both chambers provide a male and female adapter to flush the recharge solution and released precipitate molecules from the respective chamber to avoid cross-contamination, completely separated from one another by a shut-off valve in the middle of the 1¼" tube. A ¾" screened washer is placed inside a ¾" female standard hose thread nipple and screwed over the female fitting to retain the resin during the flushing of the recharged solution. During standard operation, a ¾" standard hose thread cap is screwed over the ¾" bottom flush out receptacle to seal it and a ¾" plug into the top .

There are substantial differences in this from any kind of water softening device or water deionization unit in that the beads are very tightly packed with very fine meshed screens to substantially restrict the flow to no greater than 2½ gpm flow rate which maximizes the contact time with the exchange resin to bring the general hardness (GH) down to zero ppm and the carbonate hardness (KH) to zero ppm. The pH is also altered to approximately 6.6 to 6.4 which can be adjusted by the addition of an acid or a base in the chemical injection unit.

The physical characteristics of the stripping device are as follows:

Each of the two chambers are exactly identical. It will be injection molded of a non-toxic plastic substance that is thermal in nature to withstand temperatures up to 180 degrees F., but should never exceed 100 degrees F. due to the fact that no species kept in captivity live above that range; each of the 8" protrusions of the 1 ¼" O.D. tube will be cast with national standard pipe threads (NSPT) and will have a ¾" I.D.; it will be joined in the middle with slip jointed threaded double sided shut-off valves with matching 1¼" national standard pipe thread (NSPT); there will be at the junction of the 1¼" and the 3" I.D. resin exchange chambers a disk made of Mylar with a stretched screen cast into the junction to retain the resins in their proper respective chambers. The screen, in conjunction with the compressed beads in each respective ion resin exchange chamber, will significantly slow down and restrict the flow to maximize the ion resin exchange process time that the water has physical contact to this process; screens will also be placed beneath each of the hose washers that enter and exit the unit to maintain the integrity of the beads within the stripping unit.

The closest thing to the Amazon Rainmaker on the market, or that anyone has seen up to this point that will do anything similar to what the Amazon Rainmaker has done for the past five months, is a unit that is marketed by Aquarium Pharmaceuticals, Inc., Newark, N.J., which has to be hard plumbed into the underneath of your sink and produces 20 gallons of water per day. This water does not meet the criteria of the water produced by the Amazon Rainmaker, due to fact that this is a highly compressed activated carbon filtration process and requires a recharge daily, at a retail cost of $19.95 per recharge, making the cost per gallon $1.

From my personal experimentation, the amount of precipitate removed from the water passing through the Amazon Rainmaker is in a direct relationship dependant upon the rate of flow through which the water passes through the media and the original general hardness (GH) and carbonate hardness (KH) of the water coming from the source. The greater the rate of flow, the longer the time between recharges. The slower the rate of flow, the more frequently the Amazon Rainmaker will need to be recharged. For a mean average, the Amazon Rainmaker will produce approximately 2,000 gallons of bacteria free water and also treated to be identical to the water that came directly out of the aquarium, per charge. The higher the general hardness (GH) and ppm the more frequently recharge is required.

Another tremendous difference in the Amazon Rainmaker and any kind of existing deionization unit is the fact that it does not require sodium chloride (NaCl) to be infused daily leaving massive amounts of sodium which end up in the tank and are very harmful, and often fatal to many species of tropical fish and deadly to all natural aquatic plant life.

One recharge is good for up to approximately 2,000 gallons of water (with a flow rate of 2½ gpm and a general hardness (GH) of 350 ppm). Another substantial difference in the Amazon Rainmaker and other commercial deionization units is that recharge is not done until the general hardness (GH) begins to rise indicating that the ion resin exchange beads are reaching their saturation point. This will require the use of a simple General Hardness (GH) Test Kit to test the output approximately every third to fourth usage. The inexpensive reagent type is quite adequate for this purpose. When the general hardness reaches 40 ppm, it is time to recharge the device after that usage. In all other commercial units there is a nightly flushing with sodium chloride (NaCl) brine which infuses unacceptable amounts of sodium into the water. The exchange process in the Amazon Rainmaker is not constantly reinfused with more sodium and acid to make the water lower in pH and higher in sodium (NaCl). Furthermore, it requires no permanent plumbing and can be set in your basement, standing upright on the floor with a hose that can be taken to any number of tanks in any location. It is convenient, easy to use and very efficient and is totally portable. The invention purifies water placed into an aquarium using an aquarium water purification injection system comprising: a pair of parallel chambers packed tightly with opposingly charged polymer ion resin exchange beads with tightly meshed screens to both enclose the exchange media and restrict the flow of water, thereby increasing substantially the contact time of the water with the chemical exchange process making the water at the point of exit all but void of any total dissolved solids and having reduced the pH; the water then passes through a chamber exposing it for a significant period of time to an 8 watt ultraviolet germicidal sterilization light before exiting via a standard garden hose to an injection unit where acids or bases may be added to alter pH; dechlorinization chemicals may be added to eliminate the possibility of chlorine (Cl) and chloramine (NA2Cl) poisoning. Chloramines (NA2Cl) are piggy backed molecules designed to carry the chemical purification of city water treatment out further into its distribution system. The injection unit can also inject nutrients, water conditioners and spawning aids, i.e., Tetra Black Water Extract, which is pulled by the flow of water over the extension of a siphon tube from the reservoir and regulated by a needle valve to ensure proper dispersion into the stream of purified water, the water then passes into a short section of hose with a female threaded water diffuser to eliminate a strong or heavy stream of water disturbing the gravel, plants, decorations or fish and ensuring an even distribution of all added chemicals before entering the aquarium.

Even though a part of the purification process does utilize polymer resin exchange beads, it is a significant change that the extended contact time and infrequent flushing with "recharging agents" make it significantly different from any commercial water softening purposes that are significantly aimed at cutting down on mineral residue left on bathroom fixtures and the reduction of usages in soaps and other foaming agents; none of these applications are fitting for aquarium use due to the fact that they only utilize cation resin exchange media and are flushed nightly on a timer with a very strong brine which leave the water unfit for human consumption and deadly toxic to fish.

The utilization of both cation exchange resin and anion exchange resins in conjunction with an ultraviolet sterilization chamber makes this device unique in that the general hardness (GH) and carbonate hardness (KH) are being reduced, and the total dissolved solids reduced to near untestable amounts. The pH is also being altered to meet specific requirements and the buffer is set to hold the pH at a constant; the exposure to a germicidal ultraviolet sterilization process assures the removal of harmful microscopic and submicroscopic organic pathogens in an effort to prevent disease before it is introduced into the biosphere of the aquatic environment, resulting in water of any desired specifications and eliminates the infusion of disease.

Never before in the aquarium industry has a device been made that as exactly as possible reproduces the precise properties of the water taken from the aquarium as that which it is replacing, while eliminating, the elevated levels of nitrates (NO3).

Never before has a specific device ever been invented for use in the aquarium industry, manufactured, distributed or sold that universally prepared water for every type of aquarium, every species of fish, and prepare the water so it could replicate the exacting standards of nature in a portable form for home or business use.

Never before has this purified water been pretreated to meet the requirements of the natural environment of each respective species by allowing property altering chemicals and natural extracts to be injected into the output stream through the chemical injection unit as it runs from its source directly into the tank without the use of large vats for aging, treating and mixing the water.

By properly preparing the water as made in the recited claims, it is less likely to cause stress, shock, introduction of disease and is in general the most humane manner in which to maintain captive fishes of all species.

By making the water to meet the exacting needs of each species, it will allow for the future propagation of endangered species previously unsuccessful in attempts of captive breeding programs to successfully spawn and be used to repopulate endangered and threatened species as well as their display in zoos and aquariums throughout the world.

Since the quality of the water is the single most significant factor in successfully raising any species of fish, this invention could one day, on a commercial scale, revolutionize the fish farming industry by a utilization of timed pumping of prescribed percentages of pond volume being simultaneously replaced by nitrate (NO3) free water of the identical chemistry of that which was removed effectively increasing growth rates and reducing stock to market time substantially.

The raising of delicate and difficult to breed fish depends completely upon the ability to raise the newly hatched or born young. This is the first determinate factor in hatch rates as well as infant mortality rates. This invention successful deals with this problem and has come closer by far than any other invention by conquering the water purity and properties necessary for the survival of many species, that are almost gone forever into extinction. It will promote the captive spawning of species that have heretofore been unsuccessful in all attempts to establish a successful captive breeding program.

Due to its extreme durability and unlimited lifetime with minimal recharge cost and technical knowledge, this is most certainly a revolutionary invention in the aquarium industry.

By altering the total dissolved solids to minutely detected levels, and by making the water void of any organic pathogens, the water produced by the Amazon Rainmaker is the perfect base for artificial salt water additives, and the perfect water to replace the water lost by evaporation in the marine aquarium environment to avoid an over concentration of calcium (Ca), magnesium (Mn), iron (Fe) and Copper (Cu), the most deadly of all metals in the saltwater aquaria.

The purity of the water produced by the Amazon Rainmaker also makes the water non-reactive to any other chemical agents or additives.

The ability to reproduce the properties required to successfully raise any given species and available to the average hobbyist allows all tropical enthusiasts to achieve similar successes that are attained under laboratory controlled conditions at a fraction of the cost, and expand the number of new varieties and subspecies that naturally occur to reproduce and become a new species.

Due to the fact that a threaded hot and cold faucet and a 120 volt power receptacle are all that are needed for the operation of this device, it is totally portable and may be moved from room to room or location to location should you have an aquarium maintenance business or a hatchery in which a wall separated one group of tanks from another. It may also be transported from building to building if need be.

Due to the fact that toxic recharge chemicals are only used when standard reagent general hardness (GH) test kit detects a rise of GH 5 to 40 ppm, substantially fewer recharging agents ever reach the chambers. This is significant in the water quality of the aquarium and makes it very substantially different from any other deionization unit on the market.

By placing the polymer resin exchange beads in a narrow 3" I.D. chamber and packing it tightly, it eliminates the routing or channeling effect and exposes the water passing through the chamber to every ion exchange bead, therefore, increasing its efficiency in the exchange process as well as maximizing time between the introduction of recharge chemicals.

The flush-out fittings cast at the top and bottom of each chamber allows for the complete flushing of any remaining recharge solution and released precipitate matter until the levels are below testable levels, which a timed backwash and flushing cycle do not allow. This prevents all aquatic wildlife from exposure to deadly toxins and assure the hobbyist maximum safety from contaminations.

BRIEF DESCRIPTION OF THE FIGURES AND DRAWINGS

The enclosed drawings are views and technical drawings of the water stripping and injection system according to the invention described herein.

PREFERRED EMBODIMENT

Figure 1:
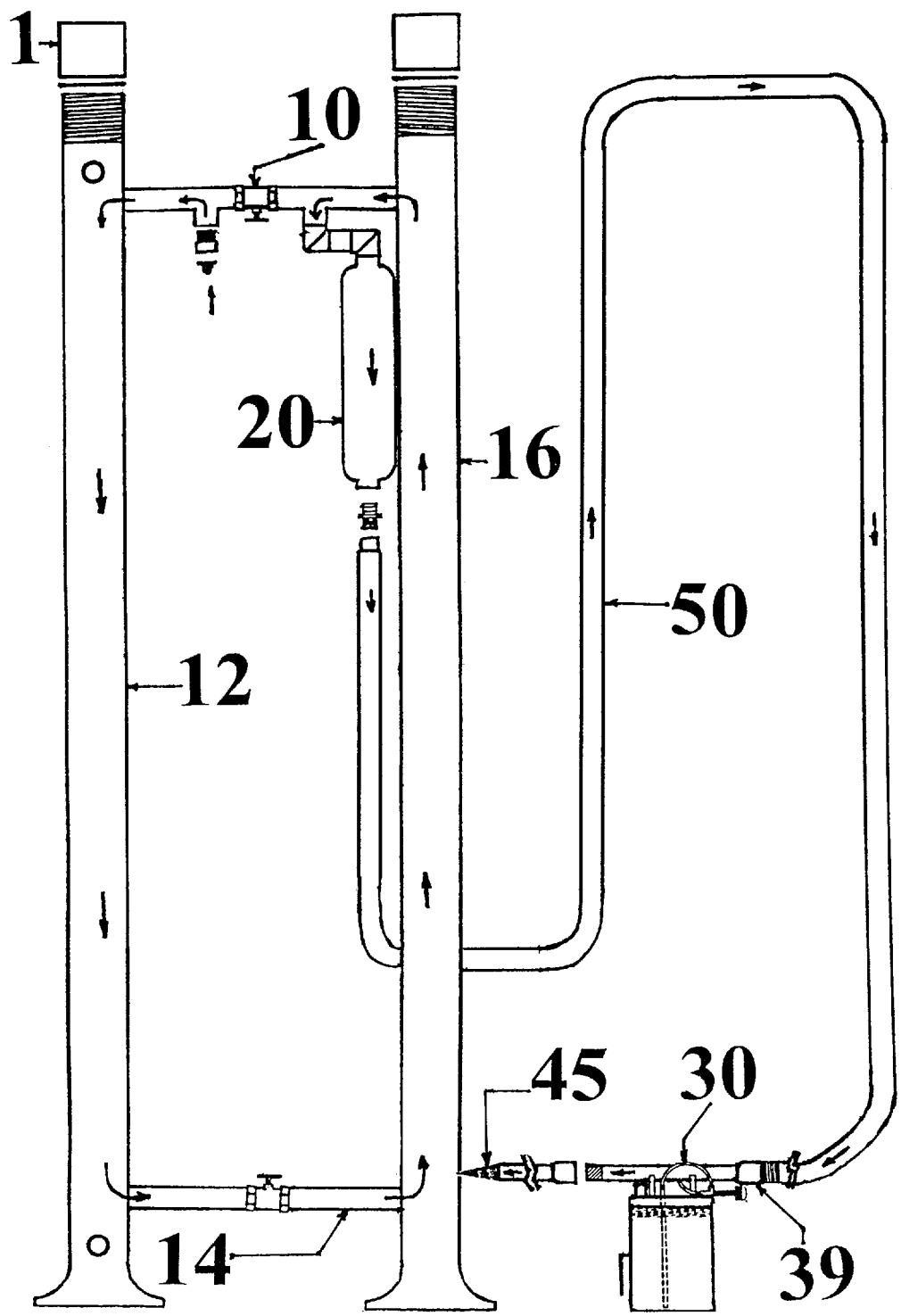
FIG. 1 illustrates an apparatus used in the present invention.

Refer to FIG. 1. Please find a complete view of the Amazon Rainmaker. Note that the left chamber 12 contains the cation resin exchange beads and the top valve 10 would be closed during regular operation. To the left of the valve is a ¾" male national standard pipe thread (NSPT) by ¾" standard garden hose thread adaptor and a screened washer 15 which fits into the ¾" female hose fitting. This is where the hose from the inlet faucets connects to the unit. The water would proceed in both directions up and down the 3" inside diameter (I.D.) of cation exchange resin beads and would eventually get to the bottom and come across the 1¼" tube 14 into the anion resin exchange chamber 16 with all of the negatively charged particles already removed. Please note that the wall thickness of the injected ion exchange chambers are 3/16" making the O.D. 3⅜". As it moves to the top, the positively charged particulate matter would also be removed and as it exits through the lefthand side of the right chamber 16, it immediately moves up through a screen and runs directly into the ultraviolet sterilization chamber 20 where the male national standard pipe thread (NSPT) by male standard garden hose thread nipple allows the connecting of a standard garden hose 50 to come down to where the female end of the hose threads directly into the female end of the chemical injector 30 and the water crosses through the top tube where there is a needle valve 39 that controls the flow and the suction created from the water passing over the extended tip of the tubing sucks the chemicals and additives into the stream of already pure water and out through the diffuser 45 out into the aquarium.

Figure 2:
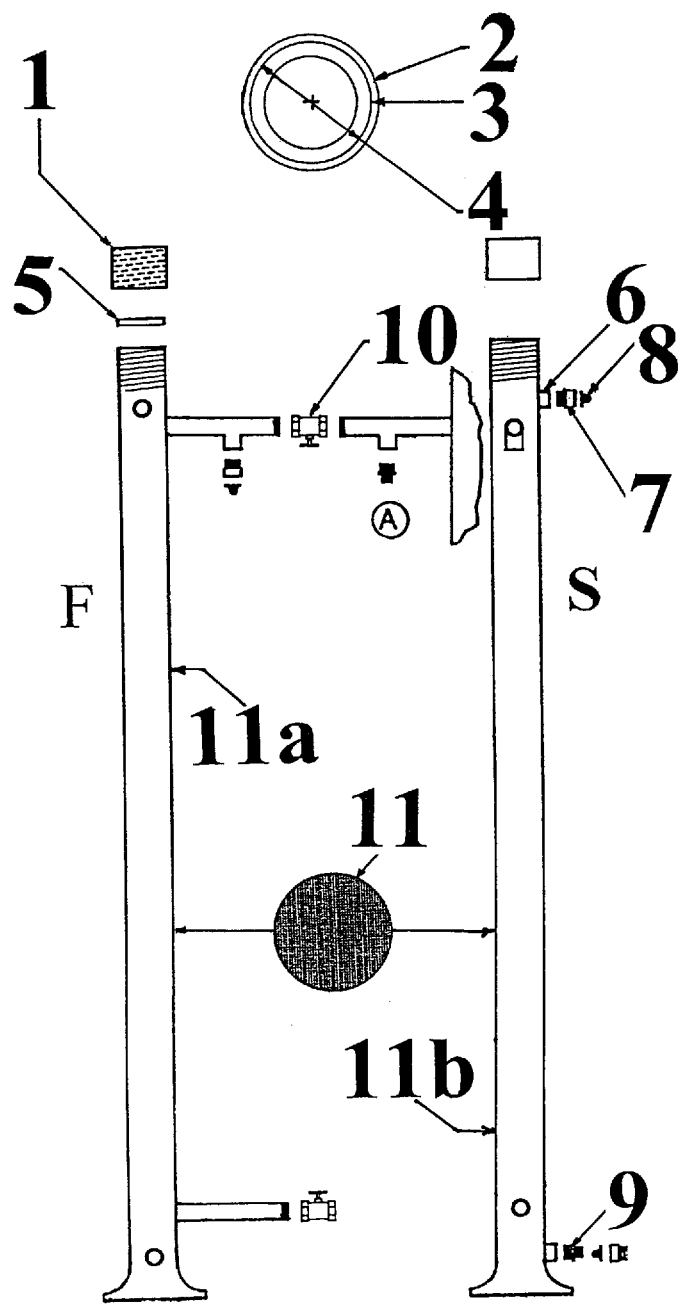
FIG. 2 illustrates a left front view of the ion exchange reactor.

FIG. 2 exhibits on the left, the front view of each of the injection molded sections of the stripping section of the Amazon Rainmaker. The top center circle is an inside view of the threaded lid or cap, the ¾" rubber flat washer that is ⅛" thick. This is designed this way for the addition of the recharge solution into each one of the respective chambers. Please notice on the right hand side a side view showing the plugs and the adaptors that go into the flush out receptacles when recharging the device. Please note that below the top valve is a cross-section of the actual resin beads themselves. The chamber walls will have a thickness of 3/16". The 1¼" pipes that are perpendicular to the chambers have a ¾" I.D. 1 3⅜" I.D./3¾" O.D. female (NSPT) cap; 2 3¾" diameter; 3 ⅜"; 4 3⅜" diameter; 5 flat rubber gasket ¾"×⅛"×3⅜" diameter; 6 4-1¼" injection molded flush-out ×¾" female (NSPT); 7 5¾" female hose thread ×¾" male (NSPT) nipple; 8 6¾" screened hose washer; 9 4¾" male (NSPT) ×¾" hose thread nipple; 10 2-1¼" shut-off valve; 11 cross section view of polymer ion resin exchange beads; 11a left chamber contains cation polymer ion resin exchange beads (445.1 cubic inches); 11b right chamber contains anion polymer ion resin exchange beads (445.1 cubic inches); F front view; S side view.

Figure 3:
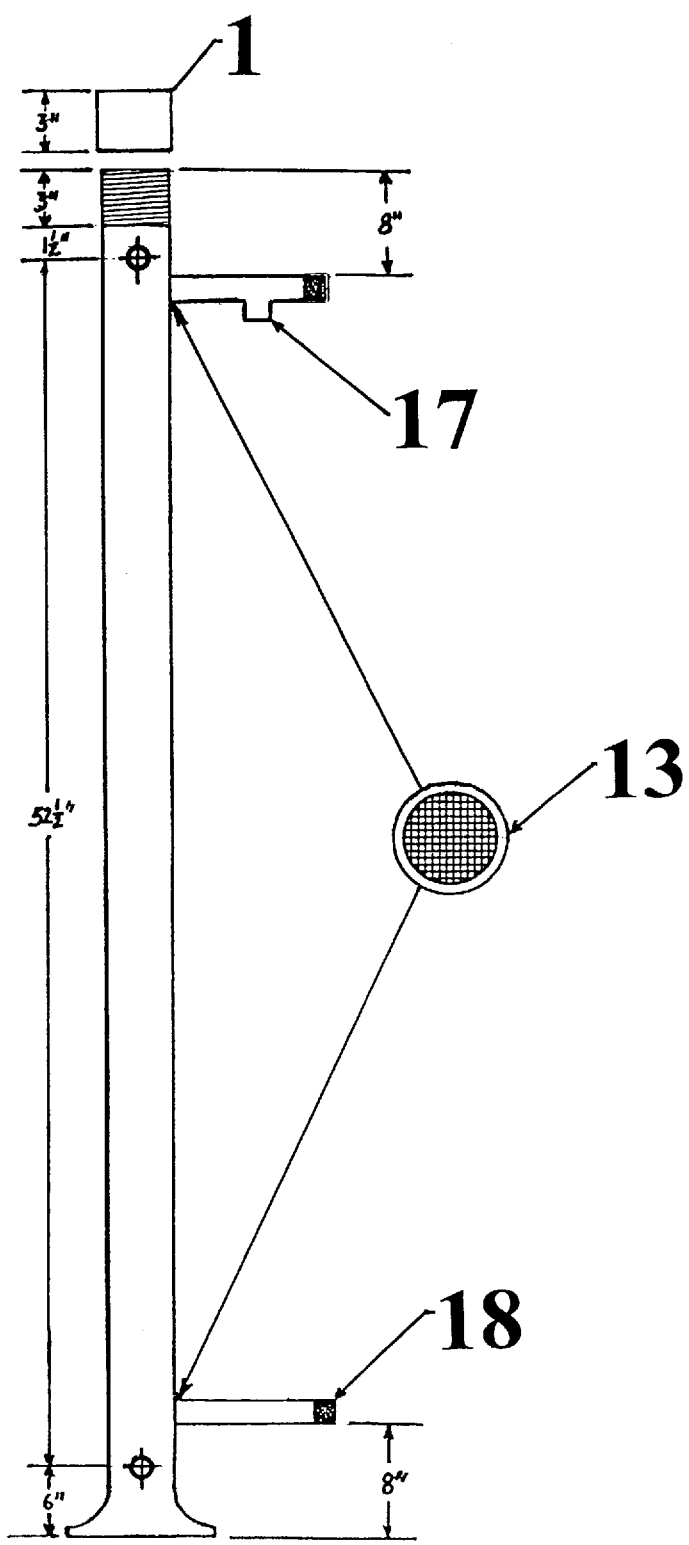
FIG. 3 illustrates a right side view of the ion exchange reactor.

FIG. 3 illustrates what outlet side (right) of the injection molded section will look like. To the right is a drawing of the screen that will be inserted at the junction of the 1¼" and 3" I.D. chamber as well as at each clean-out receptacle, to contain the respective resins in their proper chambers. Please note on the front at the bottom that there is a ¾" female standard garden hose thread with a screen washer inside and at the bottom, a male ¾" standard garden hose thread with a female ¾" standard garden hose thread coupled over the top of it with a hose washer with a screen behind it to retain the cation or anion resin exchange media within its respective chamber. This is utilized during the flushing of the recharge solution and released particulate molecules. They are capped and plugged during ordinary operations. Dimensions are also present as well. 1 3⅜" I.D./3¾" O.D. female (NSPT) cap; 17 2¼"×1" injection molded ¾" female (NSPT) off bottom of 8" branch tube; 13 4-1¾" O.D., 0.0111 diameter mesh stretched aluminum screen ring with ¼" Mylar ring to retain tension, I.D. of screen is 1¼", and the disk is injected into chamber where branch tube exits to retain resin inside chamber; 18 4–8"×1¼" O.D. ×¾" I.D. injection molded tubes.

Figure 4:
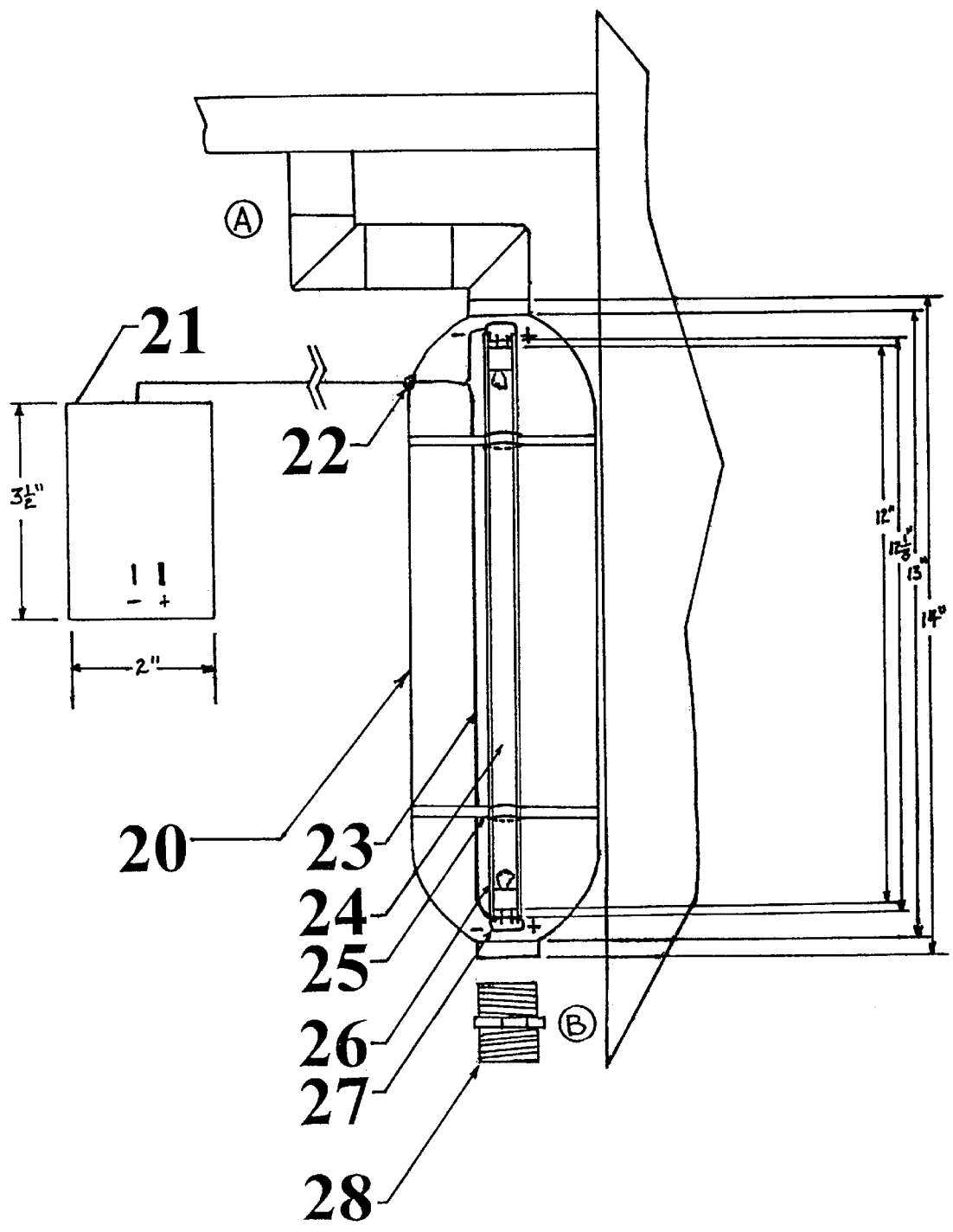
FIG. 4 illustrates an ultraviolet sterilization reactor.

FIG. 4 is a blowup of the ultraviolet sterilization chamber 20. Please note that the bulb itself is enclosed in a crystal tube and is sealed on either end with a rubber plug with female copper sockets designed to fit snugly over the prongs extending from each end of the 8 watt ultraviolet germicidal bulb. These sockets will be soldered to 20 gauge copper wire with one wire carrying positive and the other negative. This would come through the side of the chamber and be sealed with a rubber grommet with a water tight hole to ensure there would be no leakage from the sterilization chamber. This line would run directly to an instant start ballast with an input voltage of 118 volts at 60 Hz with an output of 8 watts using 0.158 amps. It comes down from the right perpendicular to, which will also be threaded in with a ¾" national standard pipe thread (NSPT) all-thread nipple screwed into a ¾" national standard pipe thread (NSPT) by ¾" glue joint elbow and bonded to an extended piece of pipe into a ¾" glue joint by ¾" national standard pipe thread (NSPT) elbow at 180 degrees from the first elbow. It is then threaded into the end of the sterilizer with a ¾" national standard pipe thread (NSPT) all-thread nipple where the water will pass through the 8 watt germicidal sterilization chamber. 21 instant start ballast, input volts 118 v. 60 Hz wattage: 8 watts 0.158 amps; 22 ¼" grommet for exit of wire; 23 20 gauge insulated wire; 24 12" 8 watt UV germicidal bulb; 25 struts to support quartz sleeve; 26 water tight quarter sleeve; 27 rubber plug with channel and with copper connectors to mate with prongs of UV bulb connecting with the wire coming from the instant start ballast; 28 ¾" male NSPT×¾" male hose thread.

Figure 5:
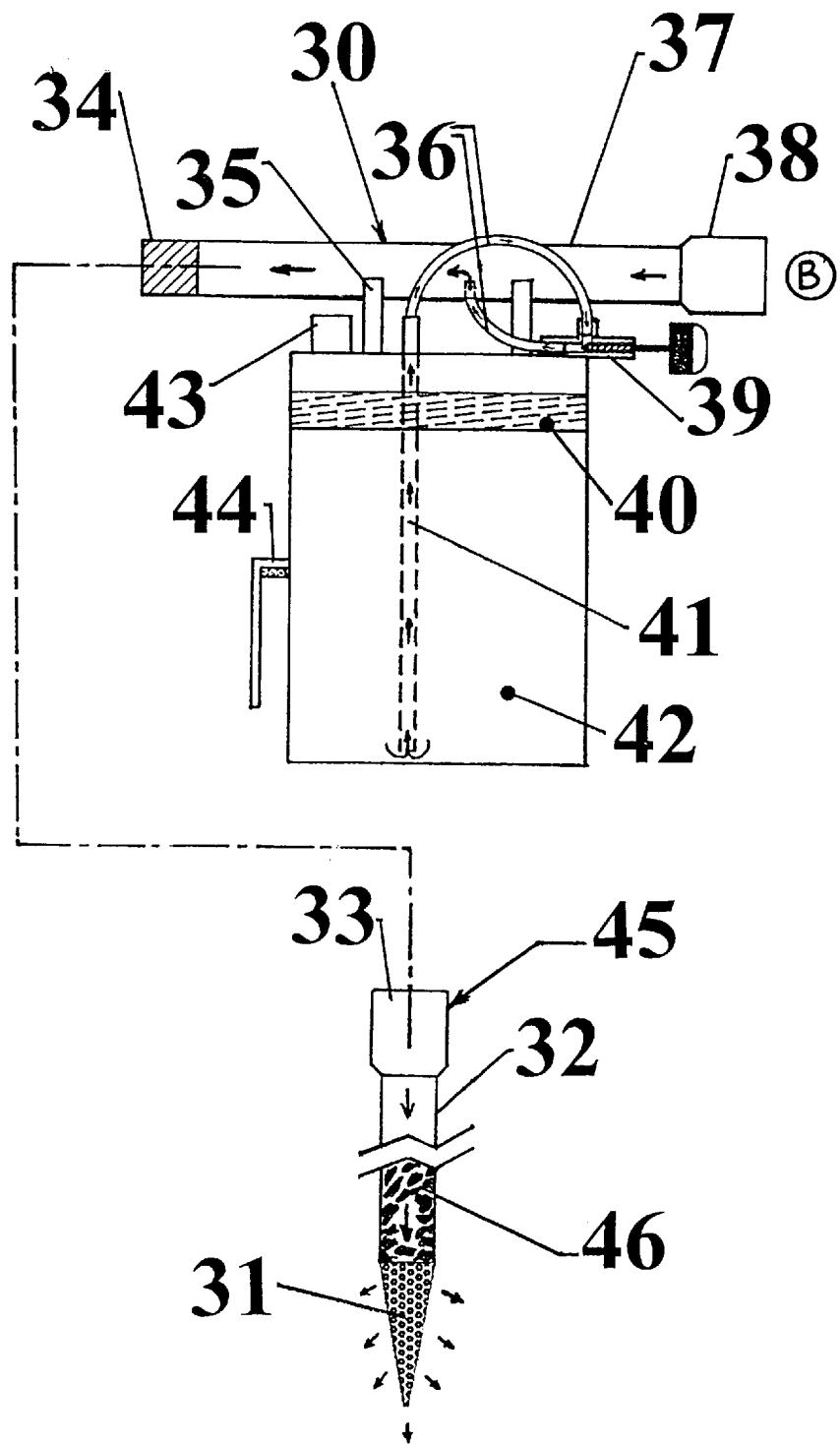
FIG. 5 illustrates a chemical injection unit and diffuser.

FIG. 5 is a self-explanatory labeled diagram of the chemical injection unit 30. Please note that it is designed to hang on the edge of the aquarium and that there will be a 3 ft. long piece of standard garden hose. This hose runs between the ¾" hose thread on the male end outlet of the injection unit to the water diffuser 45. The diffuser will have a female standard hose thread to screw on to the 3 ft. long nontoxic hose. 31 water diffuser; 32 ¾" non-toxic garden hose; 33 ¾" hose thread female end; 34 ¾ hose thread male end; 35 plastic stand-offs; 36 aquarium tubing; 37 ¾" plastic pipe; 38 ¾" hose thread female end; 39 two way needle valve; 40 threads so that the container can be twisted open to mate with threaded lid; 41 siphon tube; 42 clear/plastic or glass container 4" to 6" diameter 6" to 9" in depth; 43 spill-proof air vent; 44 hook to hang injection unit on side of tank.

I claim:

1. A process of purifying water for an aquarium comprising:

passing water into an ion exchange reactor having a first chamber with first and second ends, having a mesh screen at each of said first and second ends and containing a charged polymer ion exchange resin; said ion exchange reactor also having a second chamber with first and second ends, having a mesh screen at each of said first and second ends and containing an opposingly charged polymer ion exchange resin;

passing water from said ion exchange reactor into an ultraviolet sterilization chamber having an ultraviolet germicidal sterilization light for killing microorganisms in the water;

passing water from said ultraviolet sterilization chamber to a chemical injection unit to inject a water treatment chemical into the water;

supplying water from said chemical injection unit into said aquarium.

2. A process of purifying water for an aquarium as recited in claim 1 wherein said first chamber contains a cation ion exchange resin and said second chamber contains an anion ion exchange resin.

3. A process of purifying water for an aquarium as recited in claim 1 wherein said ultraviolet germicidal sterilization light is an 8 watt ultraviolet germicidal sterilization light.

4. A process of purifying water for an aquarium as recited in claim 1 wherein said water treatment chemical is selected from the group consisting of pH adjustment chemicals, dechlorination chemicals, medications, spawning aids, nutrients and water conditioners.

5. A process of purifying water for an aquarium as recited in claim 1 wherein the water is supplied to said aquarium using a female threaded water diffuser such that a strong flow of water into the aquarium is eliminated which protects gravel, decorations and/or fish in the aquarium from being disturbed.

* * * * *